United States Patent
Ayers et al.

(10) Patent No.: US 6,911,483 B2
(45) Date of Patent: Jun. 28, 2005

(54) ION EXCHANGERS

(75) Inventors: John Stephen Ayers, Palmerston North (NZ); David Francis Elgar, Palmerston (NZ); Margaret Mary Agnes Egan, Tauranga (NZ)

(73) Assignee: Massey University, Palmerston North (NZ)

( * ) Notice: Subject to any disclaimer, the term of this patent is extended or adjusted under 35 U.S.C. 154(b) by 0 days.

(21) Appl. No.: 10/149,332

(22) PCT Filed: Dec. 8, 2000

(86) PCT No.: PCT/NZ00/00244

§ 371 (c)(1),
(2), (4) Date: Oct. 22, 2002

(87) PCT Pub. No.: WO01/41928

PCT Pub. Date: Jun. 14, 2001

(65) Prior Publication Data

US 2003/0129719 A1 Jul. 10, 2003

(30) Foreign Application Priority Data

Dec. 8, 1999 (NZ) ................................................ 501644

(51) Int. Cl.$^7$ .................................................. C08J 5/20

(52) U.S. Cl. ........................ 521/30; 521/32; 526/238.21

(58) Field of Search ........................... 521/30, 32, 28, 521/33; 526/238.21; 536/30, 57, 87, 106

(56) References Cited

U.S. PATENT DOCUMENTS

| | | | | |
|---|---|---|---|---|
| 3,573,277 A | * | 3/1971 | Grant .......................... | 536/84 |
| 4,175,183 A | | 11/1979 | Ayers | |
| 4,178,439 A | * | 12/1979 | Ayers et al. .................. | 536/59 |
| 5,175,183 A | * | 12/1992 | Brooks et al. ................ | 514/438 |
| 5,731,259 A | | 3/1998 | Palumbo et al. | |
| 5,780,616 A | | 7/1998 | Fornasari et al. | |
| 5,811,086 A | * | 9/1998 | Matsuzawa et al. ...... | 424/70.13 |
| 6,281,172 B1 | * | 8/2001 | Warren et al. ............... | 507/110 |
| 6,531,593 B1 | * | 3/2003 | Luo et al. .................... | 536/87 |

FOREIGN PATENT DOCUMENTS

| | | |
|---|---|---|
| GB | 1421957 A | 1/1976 |
| JP | 4-61935 | 2/1992 |
| WO | WO 91/17830 | 11/1991 |

OTHER PUBLICATIONS

Levison, P. R. (1994) *A Custom Approach to Process–Scale Ion–Exchange Separations*. Chimica Oggi/Chemistry Today, pp. 41–48.

Antal, M., et al. (1992) *Preparation of Microcrystalline Cellulose Aminoderivatives*. Carbohydrate Polymers 19, pp. 167–169.

Ueda, et al. (1989) *Modified Hydroxyalkylcellulose for Separation of Nucleic Acids from Proteins*. Chemical Abstract 112:135584v, p. 385.

Maeda, et al. (1989) *Crosslinked, Cationized Hydroxyalkylcellulose Gel as Stationary Phase for Chromatography*. Chemical Abstract 112:95049r, p. 416.

Uetoko, T. (1979) *Modified Cellulose Anion Exchanger*. Chemical Abstract 91:58084a, p. 40.

Antal, M., et al. (1983) *Polysaccharide Derivatives Containing Quaternary Ammonium Groups*. Chemical Abstract 99:72429p, p. 87.

Ueda, K., et al. (1989) *Crosslinked quaternary amine–containing polymers for separation of nucleic acids and other related substances*. Chemical Abstract 113:20528h, p. 329.

Antal, M., et al. (1987) *Preparation of Trimethylammoniumhydroxypropyl Cellulose Ion Exchanger*. Chemical Abstract 109:151774a, p. 129.

Matsumoto, K., et al. (1998) *Preparation of Bead–Shaped Starch Ion Exchangers and Their Properties*. Chemical Abstract 130:63153a, p. 337.

International Search Report from PCT/NZ00/00244 completed on Feb. 9, 2001.

* cited by examiner

*Primary Examiner*—Tatyana Zalukaeva
(74) *Attorney, Agent, or Firm*—Knobbe, Martens, Olson & Bear, LLP

(57) ABSTRACT

The present invention is related to a new quaternary amino (QA) anion exchanger comprising QA derivatized, hydroxy ($C_2$–$C_4$) alkylated and cross-linked regenerated cellulose, in which the level of derivitization with the QA-groups is 1.4 milli-equivalents per dry gram (meq/g) or greater.

24 Claims, 2 Drawing Sheets

ION EXCHANGERS

CROSS-REFERENCE TO RELATED APPLICATIONS

This is the U.S. National Phase under 35 U.S.C. §371 of International Application No. PCT/NZ00/00244, filed Dec. 8, 2000 and published in English, which claims priority to New Zealand Application No. 501644, filed Dec. 8, 1999, the disclosure of which are herein incorporated by reference in its entirety.

FIELD OF THE INVENTION

This invention relates to new cellulosic ion exchangers useful for separating proteins from protein-containing solutions, and particularly for separating whey proteins from whey protein-containing solutions. The invention also relates to processes for preparing the ion exchangers.

BACKGROUND OF THE INVENTION

Ion exchangers have been used for many years to separate out proteins from protein-containing solutions. They have found application in the dairy industry, particularly in recovering whey proteins from milk and milk derived process streams, such as whey and whey protein concentrates.

Ion exchangers which have been used in separating whey proteins from whey protein containing solutions include both cation exchangers, particularly of the SP or SE (sulphonate) or CM (carboxymethyl) type, and anion exchangers, particularly of the QA (quaternary amino) or DEAE (diethylaminoethyl) type. In terms of the exchanger matrix itself, many insoluble matrices have been used, including cellulose, cross-linked dextran, cross-linked agarose, synthetic hydophilic polymers and inorganic materials coated with hydrophilic polymers.

One matrix that has proved to be particularly useful in large scale separation and purification of whey proteins is regenerated cellulose which has been hydroxyalkylated and cross-linked. Ion exchangers prepared on this matrix are resistant to attrition, have high protein capacity, high flow properties and are available at relatively low cost.

Examples of such ion exchangers based on a hydroxyalkylated and cross-linked regenerated cellulose matrix which are commercially available include the SP, CM, QA, and DEAE exchangers sold as SP GibcoCel™, CM GibcoCel™, QA GibcoCel™ and DEAE GibcoCel™ respectively. These ion exchangers were previously sold under the Indion™ brand name. QA GibcoCel™ and SP GibcoCel™ having a substitution level of the QA or SP groups of up to 1.2 milli-equivalents per dry gram (meq/g) are available. SP GibcoCel™, a cation exchanger, has been widely used, but QA GibcoCel™, an anion exchanger, has only enjoyed limited use industrially.

Levison et al (*Chimica Oggi/Chemistry Today*, 41–48, November/December 1994) refers to three custom made QA celluloses with substitution levels of 0.74, 0.96 and 1.24 meq/g, and discloses that these had similar protein capacities.

Anion exchangers bearing quaternary amino (QA) groups are typically made by alkylation of either a hydrophilic hydroxyl-bearing matrix or such a matrix already bearing tertiary amino groups such as diethylaminoethyl (DEAE) groups. In the latter case simple alkylating agents may be used such as ethylene oxide as shown in the following equation.

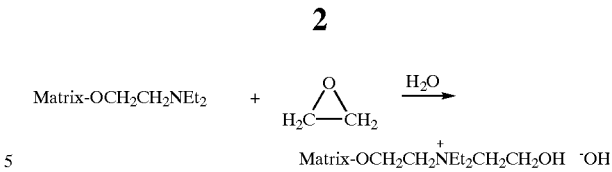

Direct alkylation of the hydrophilic matrix is achieved using agents already containing a quaternary ammonium group, eg

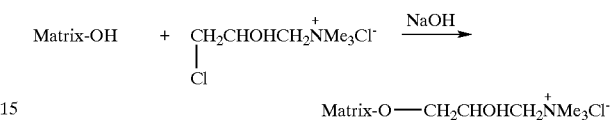

Several such reagents are summarized in U.S. Pat. No. 5,731,259 and many of them are available commercially for large scale industrial use.

Alkylating agents (3-chloro-2-hydroxypropyl) trimethylammonium chloride (CHPTAC) and glycidyltrimethylammonium chloride (GTAC) have been widely used to prepare quaternary ammonium derivatives (cationic derivatives) of polysaccharides, especially starch and cellulose. Both water soluble and water insoluble derivatives have been prepared for a variety of purposes. Only the latter are useful as anion exchangers for the adsorption and chromatography of proteins.

Japanese patent 79042385 (1979) and Chemical Abstracts 91, 58084 (Toyo Pulp KK) describe the preparation of a crosslinked QA cellulose with a degree of substitution (DS) of 0.13 (<<1 meq/g) and a protein capacity of 0.24 g/g, using 50% CHPTAC.

CS 202,374 (1983) and Chemical Abstracts 99, 72429 describe the preparation of ion exchangers with capacities of 0.37 to 0.68 meq/g from powdered cellulose. Analogous products were also obtained from crosslinked cellulose, hydroxyethyl cellulose and starch and stated to be useful as ion exchangers, sorbents and flocculants.

A further Czechoslovakian patent, CS 236,024 (1987), and Chemical Abstracts 109, 151774 describe the preparation of trimethylammoniumhydroxypropyl cellulose, an ion exchanger with an exchange capacity of 0.24 meq/g after first activating the cellulose with acetic or phosphoric acid.

Several 1989 Japanese patents, JP 01/130,726; 01/106, 898 and 01/099,646 (Daicel Chemical Industries, Ltd) (Chemical Abstracts 112, 95049; 112, 135584 and 113, 20528) disclose the preparation of crosslinked, cationized hydroxy-alkylcellulose gels for chromatography of nucleic acids. For example, hydroxyethyl cellulose is reacted with GTAC or CHPTAC and crosslinked and used to bind nucleic acids selectively from a mixture of nucleic acids and proteins. Low substitution levels of QA groups are typically useful for binding nucleic acids but not proteins, hence the selectivity observed.

WO 91/17830 describes the use of regenerated cellulose to prepare a crosslinked flexible sponge with fibrous reinforcement. This was then derivatized by reaction with CHPTAC to give a QA cellulose sponge with a protein binding capacity of 1.5 g/g. Such products have yet to be made and demonstrated on the very large scale needed for use in the dairy industry.

Antal et. al. (Carbohydrate Polymers 19, 167–169, 1992) describe the optimization of the reaction of microcrystalline cellulose with the alkylating agents CHPTAC and 1,3-bis (3-chloro-2-hydroxy-propyl)imidazolium hydrogen sulfate in alkaline medium. The maximum substitution level they were able to obtain with CHPTAC was 0.94 meq/g (mmol/g), although the second reagent gave a product with 1.56 meq/g. No protein capacities are given and it is likely that the latter reagent, being bifunctional, would have introduced extensive crosslinking into the cellulose to the detriment of protein capacity. Furthermore microcrystalline cellulose is not a suitable matrix for repeated use on a large industrial scale.

CHPTAC has been used to make a bead-shaped QA starch anion exchanger with exchange capacity of 0.90 meq/g. (Chemical Abstracts 130, 63153, 1998). The corresponding diethylaminoethyl (DEAE) starch made using 2-chloroethyl (diethyl)amine hydrochloride had a capacity of 2.47 meq/g showing the greater difficulty typically experienced in making the quaternary amino (QA) derivatives than for the tertiary amino derivatives like DEAE.

Fibrous cellulose has been derivatized with quaternary ammonium groups to a high degree of substitution, DS of at least 0.5 (>2 meq/g), using a very large excess of alkylating reagent containing quaternary ammonium groups. The cellulose is either not crosslinked (1998 U.S. Pat. No. 5,731,259) or crosslinked (1998 U.S. Pat. No. 5,780,616). Preferably the alkylating reagent is used in 20:1 to 40:1 mole ratio of reagent to anhydroglucose units of cellulose. In the case of GTAC this amounts to 186–372 g of reagent per 10 g of cellulose used either in 5–8 repeated reactions or one large addition of the solid reagent with 30 mL of water. The products, described at one point as a jelly mass, are useful as superabsorbents for water and saline solutions in the field of hygenic-sanitary products such as diapers for babies. They are designed to be used once and then disposed of and are not at all suitable for repeated use day after day in a reactor or column bed where physical robustness against attrition, long life and high flow-through rates are required for anion exchangers processing protein solutions.

With the above background in mind, it was an object of the present invention to provide an anion exchanger which is particularly useful on an industrial scale in separating whey proteins from whey protein containing solutions, or at least to provide the public with a useful choice.

SUMMARY OF THE INVENTION

Accordingly, in a first aspect the present invention provides an anion exchanger comprising a water insoluble, hydrophilic, water swellable, hydroxy($C_2$–$C_4$) alkylated and cross-linked regenerated cellulose, derivatised with quaternary amino (QA) groups, wherein the level of substitution of the QA groups is 1.4 milliequivalents per dry gram of anion exchanger (meq/g) or greater.

Preferably, the level of substitution of QA groups is from about 1.4 to about 2.5 meq/g, more preferably from about 1.5 to about 2.5 meq/g, and most preferably from about 1.7 meq/g to about 2.5 meq/g.

Preferably, the cellulose is hydroxypropylated cross-linked regenerated cellulose.

In a further aspect, the present invention provides a process of preparing an anion exchanger as defined above, the process comprising the step of reacting an anion exchanger comprising a water-insoluble, hydrophilic, water swellable, hydroxy($C_2$–$C_4$)alkylated and cross-linked regenerated cellulose derivatised with quaternary amino (QA) groups, wherein the level of substitution of QA groups is less than 1.4 meq/g, with an alkylating agent or agents capable of derivatising the anion exchanger with QA groups, under conditions suitable to achieve a level of substitution of QA groups of 1.4 meq/g or greater on the anion exchanger.

In a further aspect, the present invention provides a process of preparing an anion exchanger as defined above, the process comprising the step of reacting a water-insoluble, hydrophilic, water swellable, hydroxy($C_2$–$C_4$) alkylated and cross-linked regenerated cellulose with an alkylating agent capable of derivatising the cellulose with QA groups, under conditions suitable to derivatise the cellulose and achieve a level of substitution of QA groups of 1.4 meq/g or greater. Optionally, the above process may include the additional step of further reacting the QA-derivatised anion exchanger thus prepared with an alkylating agent capable of derivatising the anion exchanger with QA groups to achieve a higher level of substitution of QA groups.

Preferably, the alkylating agent is (3-chloro-2-hydroxypropyl)trimethylammonium chloride (CHPTAC).

Alternatively, the alkylating agent is glycidyltrimethylammonium chloride (GTAC).

In a further aspect, the present invention provides an anion exchanger obtainable by a process as defined above.

While the invention is broadly as defined above, it is not limited thereto and also includes embodiments of which the following description provides examples.

DESCRIPTION OF THE DRAWINGS

The present invention will now be described in more detail. In particular, a better understanding of the invention will be gained with reference to the accompanying drawings, in which.

DESCRIPTION OF THE INVENTION

Figure 1:
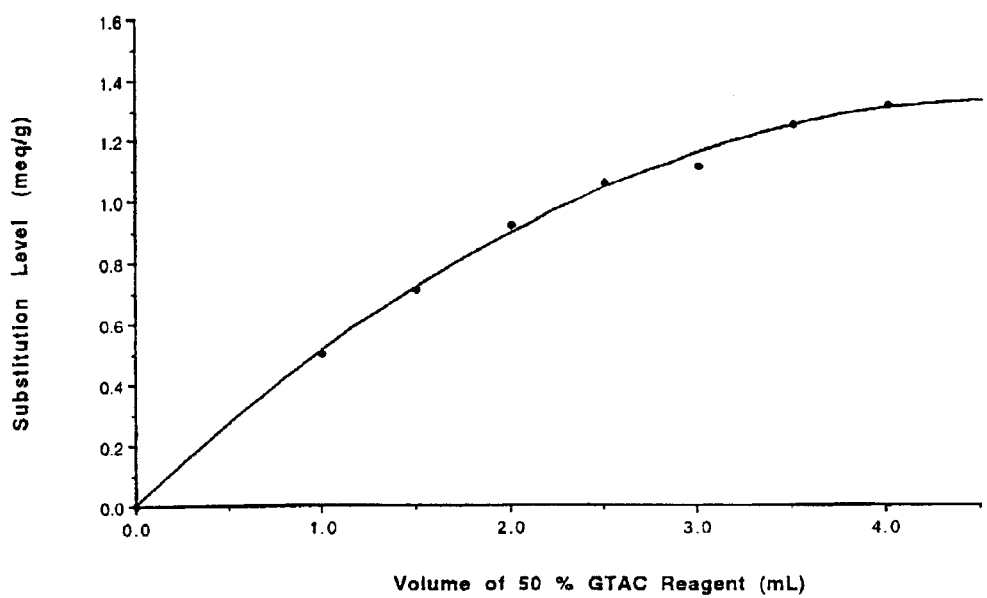
FIG. 1 shows the QA substitution level as a function of the volume of 50% GTAC reagent used to prepare QA-HP cellulose samples in Comparative Example 1.

As defined above, the present invention relates to new quaternary amino (QA) anion exchangers. In particular, the anion exchangers of the present invention comprise QA derivatised, hydroxy($C_2$–$C_4$)alkylated and cross-linked regenerated cellulose, in which the level of derivatisation with the QA groups is 1.4 meq per dry gram of anion exchanger (meq/g) or greater.

The applicants have now found that it is possible to prepare QA derivatives of hydroxyalkylated regenerated cellulose having substitution levels higher than those described in the prior art. We have also surprisingly found that such derivatives, where they exceed substitution levels of 1.4 meq/g, possess advantages over QA derivatives of hydroxylated cross-linked regenerated cellulose having lower substitution levels, in that they have a significantly higher effective protein binding capacity when used to recover protein from protein-containing solutions having more than a relatively low ionic strength, and in particular milk protein-containing solutions such as whey and whey protein concentrates.

The finding that a substituted QA-derivatised anion exchanger of the GibcoCel™ type having a minimum substitution level of 1.4 meq/g has an improved protein binding capacity over currently available QA anion exchangers (which have a level of derivatisation of up to 1.2 meq/g) for solutions such as whey is particularly surprising, in view of the fact that the corresponding SP cation exchangers having 0.8 and 1.4 meq/g have been found to be almost equally effective at adsorbing protein from whey (Ayers & Peterson N. Z. *J. Dairy SCL and Technol.*, 20, 129–142, 1985).

It is these findings by the applicants which form the basis of the present invention.

In this specification, the term "QA" or "quaternary amino", when used in the context of ion exchangers, means a functional group selected from a group of the formula —$R_1$-Z, wherein $R_1$ is a lower alkylene group containing 1 to 3 carbon atoms and optionally substituted with a hydroxyl group, and Z is a quaternized amino group of the formula: —$NR_2R_3R_4^+OH^-$ or salts thereof, wherein $R_2$, $R_3$ and $R_4$ are each a lower alkyl group containing 1 to 4 carbon atoms, optionally substituted with a hydroxyl group, or a further group of the formula —$R_1$—$NR_2R_3R_4^+OH^-$ or salts thereof wherein $R_1$, $R_2$, $R_3$ and $R_4$ are as defined above. Examples of suitable QA groups are —$CH_2CH_2N^+R_2R_3R_4Cl^-$ and —$CH_2CHOHCH_2N^+R_2R_3R_4Cl^-$, wherein $R_2$, $R_3$ and $R_4$ are the same or different and are selected from —$CH_3$, —$CH_2CH_3$, —$CH_2CH_2OH$, —$CH_2CHOHCH_3$, —$CH_2CH_2N^+R_2R_3R_4Cl^-$ and —$CH_2CHOHCH_2N^+R_2R_3R_4Cl^-$.

It is preferred that in the QA anion exchangers of the present invention, the level of substitution of the QA groups is in the range of from about 1.4 to about 2.5 meq/g, more preferably from about 1.5 to about 2.5 meq/g, and most preferably from about 1.7 meq/g to about 2.5 meq/g.

The matrix for the anion exchangers of the present invention comprises a water insoluble, hydrophilic, water swellable hydroxy($C_2$–$C_4$)alkylated and cross-linked regenerated cellulose. Such matrices and processes for preparing them are described for example in U.S. Pat. No. 4,175,183 (John S Ayers), the full contents of which are incorporated herein by reference. By way of example, a suitable cellulose matrix can be prepared by reacting commercially available granular or beaded regenerated cellulose with epichlorohydrin and propylene oxide in the presence of a strong base (conveniently NaOH). Such matrices may be useful for repetitive use on a large industrial scale.

The QA anion exchangers of the present invention having a substitution level of 1.4 meq/g or greater may be prepared by reacting a cellulose matrix as described above with a suitable alkylating agent capable of derivatising the cellulose with QA groups. Conveniently, the alkylating agent may be an agent containing quaternary ammonium groups, preferably (3-chloro-2-hydroxypropyl)trimethylammonium chloride (CHPTAC) or glycidyltrimethyl ammonium chloride (GTAC), and the reaction carried out in the presence of a strong base, conveniently sodium or potassium hydroxide. CHPTAC and GTAC are known reagents for introducing QA groups into cellulose, but at lower substitution levels (see, for example Carbohydrate Polymers 19, 167–169, 1992). However, in order to prepare the anion exchangers having the level of QA substitution of the present invention, it will usually be necessary to employ very concentrated solutions of reagents. For example, it is preferred that when CHPTAC is used as the alkylating agent, the concentration of CHPTAC reagent is about 50 wt % or greater, more preferably about 60 wt % or greater, and when GTAC is used, the concentration of GTAC reagent is greater than 50% w/v, more preferably about 70% w/v or greater.

By way of example, the following process may be used to prepare the QA anion exchangers of the present invention, having a substitution level of 1.4 meq/g or greater.

A water insoluble, hydrophilic, water swellable hydroxypropylated and cross linked regenerated cellulose may be prepared by first forming a mixture of 10 g regenerated cellulose with 3–10 mL of propylene oxide, 0.5–1 mL of epichlorohydrin and 8–20 mL of aqueous sodium hydroxide solution at a concentration of 15–40% (w/v), or 10–15 mL of aqueous hydroxide solution at a concentration of 20–30% (w/v). The mixture is then reacted at 40–60° C. for 1–4 hours. At the end of reaction, most of the sodium hydroxide remains in the matrix still, as only the reactions of epichlorohydrin consume base. It is preferable to leave the hydroxide in the cellulose for further reaction with the alkylating reagent.

When GTAC is used as the alkylating agent, 15–20 mL of 70% (w/v) solution is mixed in with the cellulose and reaction accomplished at 10–50° C. over 1–8 hours, preferably 20–25° C. for 2–3 hours. The reaction of GTAC is catalysed by hydroxide. The reaction time and temperature are thus not greatly dependent on the amount of GTAC added. The amount of GTAC reagent added will be selected to achieve the desired substitution level.

When CHPTAC is used as the alkylating agent, 12–20 mL of a 60 wt % solution is mixed in with the cellulose and reaction accomplished at 20–50° C. for 2–24 hours, preferably at 25° C. for 6–24 hours, although the time can be shortened by heating to 60–80° C. for 1–2 hours at the finish. Hydroxide is consumed during this reaction and the reaction time increases as the amount of reagent used is increased as a result of consumption of hydroxide by the competing alkylation and hydrolysis reactions.

In the case of both the GTAC and CHPTAC reagents it is preferable to keep the volume added to 20 mL or less (when working with the above proportions) so that a separate aqueous phase does not separate out from the cellulose. To limit the competing hydrolysis reactions of the reagents it is desirable to limit the amount of water present in the reaction mixture and use the highest concentration of reagent available.

In either of the above processes, it is possible to repeat the QA derivatisation procedure, if required, where a relatively high level of derivatisation (such as around 2.0 meq/g or higher) is desired. In such cases the procedure described in the following alternative embodiments would be used.

In an alternative embodiment, the QA anion exchangers of the present invention may be prepared by using as the starting material a commercially available QA hydroxyalkylated and cross-linked regenerated cellulose, such as that sold as QA GibcoCel™, which has a QA substitution level of 1.2 meq/g. The applicants have found that a higher QA substitution level can be achieved by further processing the already derivatised exchanger using alkylating agents bearing quaternary ammonium groups such as GTAC and CHPTC, again in the presence of a strong base.

By way of example, the following process may be used to prepare the QA anion exchangers of the present invention, having a substitution level of 1.4 meq/g or greater, using a similarly but lower substituted exchanger (conveniently QA GibcoCel™) as a starting material.

QA GibcoCel™ in its hydrated form has a dry matter content of only 12–13%. Because of the large amount of water already present in the product, it is often preferable to process this further as a slurry with alkylating agent and base. Accordingly, hydrated QA GibcoCel™ is mixed with extra water and concentrated sodium hydroxide solution to form a thick slurry with a final sodium hydroxide concentration of 1.5–3.0% (w/v), taking into account the water already present in the hydrated QA GibcoCel™ (85–90% of its wet weight). CHPTAC, at a concentration of 60 wt %, is added in an amount of 5–25 mL/100 g of QA GibcoCel™ to achieve the desired increase in substitution level. The conditions should be chosen such that there is an excess of hydroxide present over CHPTAC in the reaction mixture. Reaction is generally accomplished at 10–50° C. for 2–24 hours, preferably 20–30° C. for 6–24 hours, or 17 hours with a further 1–2 hours at 60–80° C.

In either of the above methods of preparing a QA anion exchanger of the invention, the sodium hydroxide could be replaced by an equivalent amount of potassium hydroxide.

As mentioned above, the applicants have found that the anion exchangers of the present invention have a higher protein capacity under all conditions of ionic strength, except low ionic strength (eg <25 mM) than known, commercially available QA derivatised hydroxyalkylated cross-linked regenerated cellulose anion exchangers with a lower level of QA substitution. The applicants have further found that the ion exchangers of the present invention maintain their protein capacity up to modest ionic strength, about 50 mM NaCl, allowing them to be more industrially useful than known commercially available QA derivatised hydroxyalkylated cross-linked regenerated cellulose anion exchangers with a lower level of QA substitution. The latter loses capacity immediately the ionic strength is raised above the minimum level provided by the dilute buffer salts, i.e. about 10 mM.

The anion exchangers of the present invention therefore have particular application in recovering proteins from protein-containing solutions having more than a relatively low ionic strength, and in particular, and surprisingly, for recovering whey proteins from milk and milk derived process streams, such as whey and whey protein concentrates.

The invention will now be described in more detail with reference to the following non-limiting examples.

EXAMPLES

Example 1 Comparative (a) Preparation of Hydroxypropyl Cellulose (HP-Cellulose)

Granular regenerated cellulose (14 g) (150–250 μm) (Life Technologies Ltd, Auckland, New Zealand) was mixed in a stainless steel vessel with cold 25% (w/v) aqueous sodium hydroxide (21 mL) and 0.84 mL of epichlorohydrin dissolved in 7 mL of propylene oxide. The mixture was stirred thoroughly until the cellulose had finished swelling and all the liquid had been absorbed. The reaction vessel was then sealed and placed in a water bath at room temperature and heated to 50° C. over 30 minutes. After one hour the reaction vessel was cooled and damp, friable cellulose powder (cross-linked and hydroxypropylated cellulose, HP-cellulose) was taken and, without washing, divided into seven equal fractions.

(b) Alkylation with Glycidyltrimethylammonium Chloride (GTAC)

Each of the HP-cellulose fractions was placed in a screw-topped jar, cooled to 4° C. and mixed with an aliquot (1–4 mL) of an aqueous solution (50% w/v) of glycidyltrimethylammonium chloride (GTAC). (Using volumes larger than 4 mL of this reagent did not give satisfactory reaction mixtures or products.) The jars were sealed and placed in a water bath at 25° C. for 3 hours. The QA-cellulose products were soaked in water and then collected on sintered glass filters and washed with water, 1 M hydrochloric acid and further water, before being drained on the filter under vacuum.

Small samples (about 5 g) of the moist products were converted to their hydroxide form by further washing with 1M sodium hydroxide followed by demineralized water. The samples were then titrated in 1M sodium chloride with 1.00 M hydrochloric acid to an end-point of pH 4. After titration each sample was collected on a dry tared sintered-glass filter, washed with water and dried overnight at 105° C. The substitution level was calculated as the small ion exchange capacity (S.I.C.) in milli-equivalents per dry gram (meq/g), i.e. S.I.C.=V/wt where V=volume in mL of 1.00 M HCl, and wt=dry weight of the sample (g).

Further samples in the chloride form were assayed for their protein binding capacities. A 0.5% solution of β-lactoglobulin was prepared in 0.01 M sodium dihydrogen phosphate. The pH of this solution was adjusted to 7.5 by the careful addition of 5 M sodium hydroxide. Aliquots (20 mL) were transferred to vials containing weighed samples of moist QA cellulose (300–400 mg). The vials were then sealed and gently mixed for 2 hours at room temperature. They were left to stand for 2–5 minutes before a sample of the supernatant was taken and filtered through a 2 mL disposable column (Pierce Chemical Co. USA). A 1 mL sample of the filtrate was added to 20 μL of 1 M hydrochloric acid and made up to 10 mL total volume with water before measuring the absorbance at 280 nm. The dry matter of the ion exchanger used was determined by drying samples (0.5–1 g) in triplicate. The capacity of the exchanger, grams of protein per gram of dry ion exchanger, was calculated by comparison with an $A_{280}$ reading of the original protein solution diluted similarly.

Figure 2:
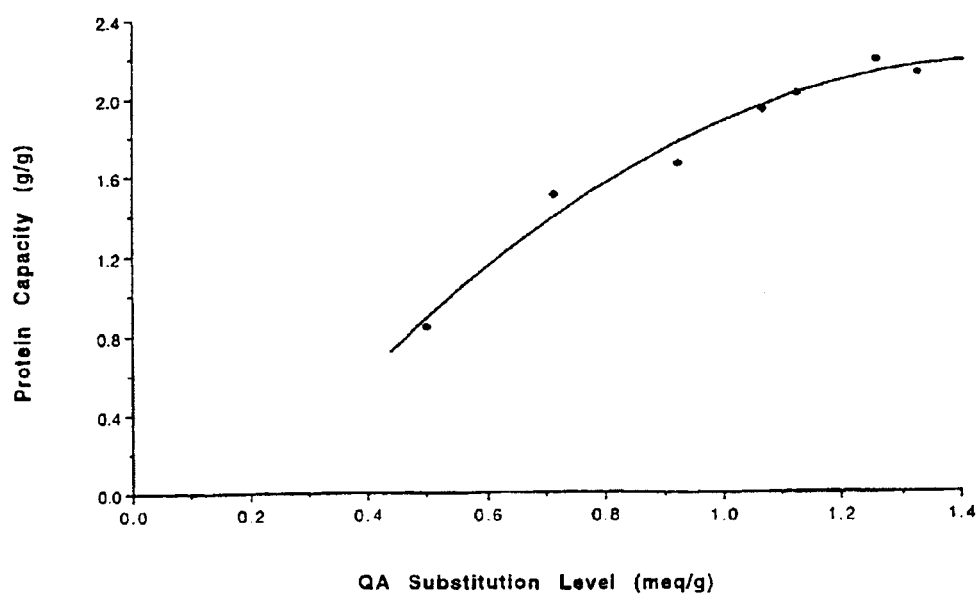
FIG. 2 shows the protein capacity as a function of the QA substitution level for the QA-HP cellulose samples of Comparative Example 1.

The results of these tests are shown in FIGS. 1 and 2. FIG. 1 clearly indicates a maximum substitution level of 1.3–1.4 meq/g which can be achieved using this reagent. FIG. 2 shows the β-lactoglobulin capacity as a function of substitution level and indicates that the maximum capacity of around 2.1 g/g would not be improved by raising the substitution level above 1.3 meq/g.

Example 2

QA GibcoCel™ HG2 (1.17 meq/g), a commercially available anion exchanger made from the same granular regenerated cellulose as used in Example 1, was obtained from Life Technologies Ltd, Auckland, New Zealand. It was suspended in water and then collected on a sintered-glass filter where it was washed with 1 M hydrochloric acid, water, 1 M sodium hydroxide and finally de-ionised water. It was then drained of excess water by vacuum filtration. This QA cellulose in its hydroxide form was then further alkylated to raise the density of positively charged QA groups.

The QA GibcoCel™[OH$^-$] was made up to a thick slurry by the addition of water and 30% (w/v) aqueous sodium hydroxide. The mixture was chilled before adding (3-chloro-2-hydroxypropyl)trimethylammonium chloride (60 wt. % solution in water). The amounts used are shown in Table 1. These ingredients were mixed as a slurry for 17 hours at room temperature followed by 2 hours at 60° C. The QA cellulose products were collected on filters and washed with water, 1 M hydrochloric acid and de-ionised water before removing the excess water by vacuum filtration.

TABLE 1

Preparation Details and Properties of QA Celluloses

|  | QA GibcoCel | #1 | #2 | #3 |
|---|---|---|---|---|
| Preparation |  |  |  |  |
| QA GibcoCel ™ (wet g) | — | 45 | 45 | 45 |
| Water (mL) | — | 31 | 31 | 28.5 |
| 30% NaOH (mL) | — | 5 | 5 | 7.5 |
| CHPTAC* (mL) | — | 3 | 6 | 9 |
| Properties |  |  |  |  |
| S.I.C. (meq/g) | 1.17 | 1.51 | 1.84 | 2.02 |
| β-1 g capacity (g/g) | 1.85 | 1.75 | 1.65 | 1.38 |

*(3-chloro-2-hydroxypropyl)trimethylammonium chloride, 60 wt % solution in water Samples of each product and the starting QA GibcoCel™ were analysed to determine their small ion exchange capacities and β-lactoglobulin (β-lg) capacities as described in Example 1. The results, shown in Table 1, clearly indicate that the subsitution level of quaternary amino groups on QA GibcoCel™ can be raised to 2 meq/g by this alkylation procedure but that there is no benefit for the β-lactoglobulin capacity under conditions that are typically used to measure protein capacity. In fact the capacity deteriorated, particularly for preparation #3.

Example 3

The β-lactoglobulin capacity tests on the four QA celluloses described in Example 2 were repeated in the presence of 80 mM sodium chloride. This was achieved using the capacity test as described in Example 1 except that the β-lactoglobulin was dissolved in 0.01 M sodium dihydrogen phosphate containing 80 mM sodium chloride and adjusted to pH 7.5. The results are shown in Table 2. When the ionic strength of the test solution was deliberately raised in this way then an increase in the protein capacity of 50% or more was observed when the substitution level of QA GibcoCel™ was raised to >1.5 meq/g.

TABLE 2

β-Lactoglobulin Capacities of QA Celluloses
in 80 mM NaCl at pH 7.5

| Preparation | QA GibcoCel | #1 | #2 | #3 |
|---|---|---|---|---|
| S.I.C. (meq/g) | 1.17 | 1.51 | 1.84 | 2.02 |
| β-1g capacity (g/g) | 0.64 | 0.98 | 1.10 | 1.11 |

Example 4

The effect of ionic strength on β-lactoglobulin binding capacities of QA GibcoCel™ (1.17 meq/g) and the QA cellulose preparation #2 (1.84 meq/g) from Example 2 was further investigated using a capacity test similar to that outlined in Example 1 but with sodium chloride present at different concentrations. This was achieved as follows.

Figure 3:
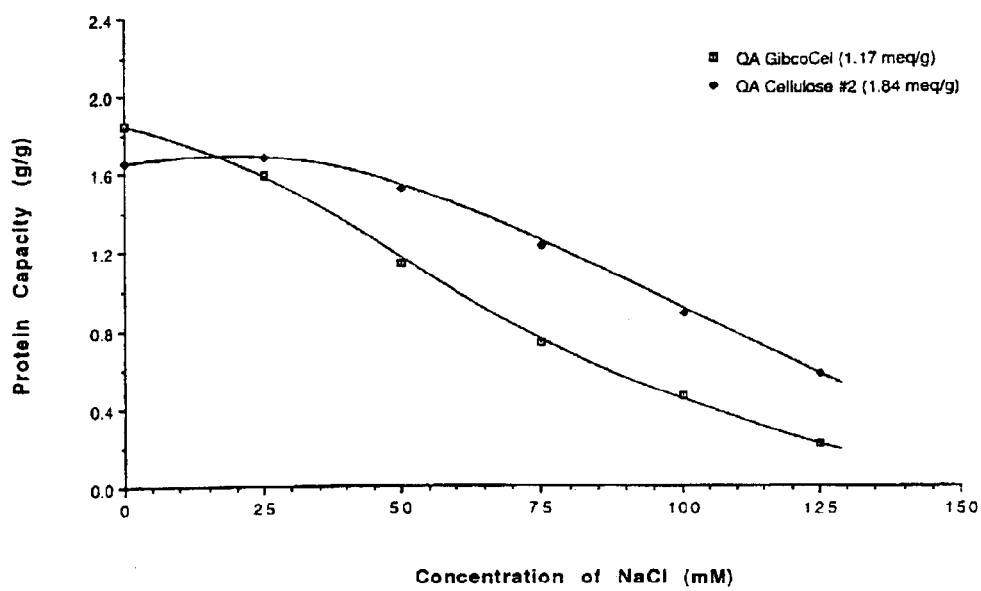
FIG. 3 shows the protein capacity as a function of NaCl concentration for the anion exchanger QA GibcoCel™ and for an anion exchanger according to the present invention (QA cellulose #2 (1.84 meq/g))

A 1% solution of β-lactoglobulin was prepared in 0.02 M sodium dihydrogen phosphate. The pH of this solution was carefully adjusted to 7.5 with 5 M sodium hydroxide. Samples of ion exchanger (300–400 mg) were weighed into glass vials. To these were added enough water and 1 M sodium chloride, together totalling 10 mL, to give final sodium chloride concentrations of 0, 25, 50, 75, 100 and 125 mM following the later addition of 10 mL of the protein solution. After mixing gently for 2 hours a sample of the supernatant was taken and assayed at 280 nm as described in Example 1. The results are shown in FIG. 3. In the presence of sodium chloride at concentrations >100 mM, the β-lactoglobulin capacity of the more highly substituted QA cellulose was more than double that of QA GibcoCel™.

Example 5

This was similar to Example 1 except that a more concentrated solution of glycidyltrimethylammonium chloride (GTAC) was used, 70% instead of 50%.

Granular regenerated cellulose (14 g) was converted into HP-cellulose as described in Example 1. At the end of reaction, 28 mL of 70% (w/v) GTAC was added to the chilled HP-cellulose, mixed thoroughly and held for 3 hours at 25° C. The QA cellulose product was washed up and analysed as described in Example 1. The substitution level was 1.68 meq/g and the β-lactoglobulin capacity, 2.06 g/g.

Example 6

(a) Preparation of HP-Cellulose

Granular regenerated cellulose powder (10 g) was mixed with 15 mL of cold 30% (w/v) aqueous sodium hydroxide, 0.7 mL of epichlorohydrin dissolved in 5 mL of propylene oxide and reacted at 50° C. for 1 hour as described in Example 1.

(b) Alkylation with (3-chloro-2-hydroxypropyl)trimethylammonium Chloride (CHPTAC)

After chilling the reaction vessel and contents, an aqueous solution of (3-chloro-2-hydroxypropyl)trimethylammonium chloride (18 mL of 60 wt. %) was slowly added to it while stirring thoroughly. It was then held at 25° C. for 17 hours followed by 1.5 hours at 60° C. The QA cellulose product was soaked in excess water and collected on a filter, washed with water, 1M hydrochloric acid and then de-ionised water. Samples were analysed as described in Example 1. The substitution level was found to be 2.08 meq/g and the β-lactoglobulin capacity, 2.03 g/g.

Example 7

A sample of QA cellulose (2.08 meq/g) from Example 6 was further processed in place of QA GibcoCel™ (1.17 meq/g) as described in Example 2 for product #2. Six mL of (3-chloro-2-hydroxypropyl)trimethylammonium chloride was reacted with 45 g of QA cellulose [OH⁻], 31 mL of water and 5 mL of 30% (w/v) aqueous sodium hydroxide. The product had a substitution level of 2.52 meq/g and a β-lactoglobulin capacity of 1.96 g/g.

Example 8

Figure 4:
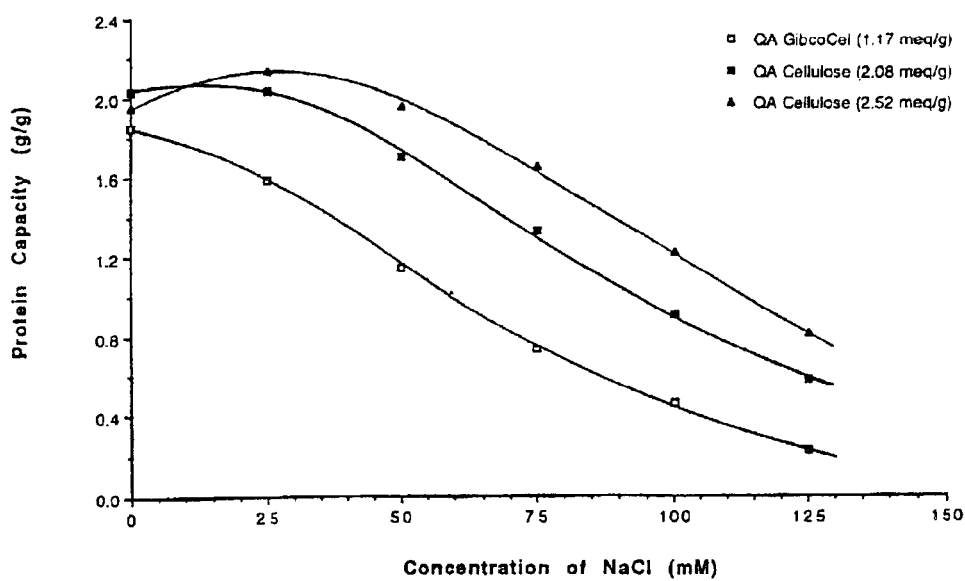
FIG. 4 shows the protein capacity as a function of NaCl concentration for the anion exchanger QA GibCoCel™ and two anion exchangers according to the present invention (QA cellulose 2.08 meq/g and 2.52 meq/g).

The β-lactoglobulin capacities of the QA celluloses from Examples 6 (2.08 meq/g) and 7 (2.52 meq/g) were determined over a range of ionic strengths (0–125 mM NaCl) at pH 7.5 as described in Example 4. The results are shown in FIG. 4 along with those for QA GibcoCel™. Although the substitution level had little impact on the protein capacity in the absence of sodium chloride, in the presence of elevated ionic strength the more highly substituted QA celluloses showed considerably enhanced capacities, up to four times greater at a sodium chloride concentration of 125 mM.

Example 9

Clarified cheese whey was adjusted from pH 5.7 to 6.5 with aqueous sodium hydroxide. Aliquots (50 g) of this were then mixed at room temperature with 10 mL (6.67 g)

samples of QA GibcoCel™ and of the more highly substituted QA celluloses prepared from it (Preparations #2, #3 and #4 from Example 2). (All the QA celluloses after washing and draining were found to have a settled volume of 1.5 mL/wet g by separate experiment where a sample (about 10 g) was allowed to settle in water in a 25 mL measuring cylinder overnight.) After mixing for 1 hour, the QA celluloses were separated from the protein-reduced whey on sintered glass filters and washed with water. The combined filtrate and washings (60 g) were analysed for total nitrogen and non-protein nitrogen to determine the residual protein concentrations. A sample of the cheese whey at pH 6.5 was similarly analysed and the amount of protein (%) adsorbed by each of the QA celluloses calculated. The results are shown in Table 3.

Samples of the whey and the protein-reduced filtrates were also analysed by reverse phase HPLC to determine the residual concentration of β-lactoglobulin. These values were used to calculated the amount of β-lactoglobulin (%) absorbed from the whey. The results are shown in Table 3. Clearly it would be advantageous to use a product with a substitution level of 1.5 meq/g or greater when recovering protein or β-lactoglobulin from whey by ion exchange.

TABLE 3

Protein Adsorption from Cheese Whey by QA Celluloses

| QA Cellulose* | Substitution Level (meq/g) | Total Protein Adsorbed (%) | β-lactoglobulin Adsorbed (%) |
|---|---|---|---|
| QA GibcoCel ™ | 1.17 | 52 | 56 |
| Preparation #1 | 1.51 | 66 | 78 |
| Preparation #2 | 1.84 | 72 | 89 |
| Preparation #3 | 2.02 | 76 | 93 |

*Products from Example 2

INDUSTRIAL APPLICATION

It is believed that the anion exchangers of the present invention, which combine the industrial suitability of a hydroxyalkylated, cross-linked regenerated cellulose matrix with a greater protein capacity when used in the processing of milk protein containing raw materials, will prove particularly useful in the dairy industry.

Although the invention has been described with reference to particular embodiments, those persons skilled in the art will appreciate that variations and modifications may be made without departing from the spirit and scope of the invention as defined in the claims.

What we claim is:

1. An anion exchanger comprising a water insoluble, hydrophilic, water swellable, hydroxy($C_2$–$C_4$alkylated and cross-linked regenerated cellulose, derivatised with quaternary amino (QA) groups, wherein the level of substitution of the QA groups is 1.4 milliequivalents per dry gram of anion exchanger (meq/g) or greater.

2. An anion exchanger as claimed in claim 1, wherein the level of substitution of QA groups is from about 1.4 to about 2.5 meq/g.

3. An anion exchanger as claimed in claim 2, wherein the level of substitution of QA groups is from about 1.5 to about 2.5 meq/g.

4. An anion exchanger as claimed in claim 3, wherein the level of substitution of QA groups is from about 1.7 meq/g to about 2.5 meq/g.

5. An anion exchanger as claimed in claim 1, wherein the cellulose is hydroxypropylated cross-linked regenerated cellulose.

6. A process of preparing an anion exchanger as claimed in claim 1, the process comprising the step of reacting an anion exchanger comprising a water-insoluble, hydrophilic, water swellable, hydroxy($C_2$–$C_4$alkylated and cross-linked regenerated cellulose derivatised with quaternary amino (QA) groups, wherein the level of substitution of QA groups is less than 1.4 meq/g, with an alkylating agent or agents capable of derivatising the anion exchanger with QA groups, under conditions suitable to achieve a level of substitution of QA groups 1.4 meq/g or greater on the anion exchanger.

7. A process of preparing an anion exchanger as claimed in claim 1, the process comprising the step of reacting an anion exchanger comprising a water-insoluble, hydrophilic, water swellable, hydroxy($C_2$–$C_4$)alkylated and cross-linked regenerated cellulose derivatised with quaternary amino (QA) groups, under conditions suitable to derivatise the cellulose and achieve a level of substitution of QA groups 1.4 meq/g or greater.

8. A process as claimed in claim 7, including the additional step of further reacting the QA-derivatised anion exchanger thus prepared with an alkylating agent capable of derivatising the anion exchanger with QA groups to achieve a higher level of substitution of QA groups.

9. A process as claimed in claim 6, wherein the alkylating agent is (3-chloro-2-hydroxypropyl)trimethylammonium chloride (CHPTAC).

10. A process as claimed in claim 6, wherein the alkylating agent is glycidyltrimethylammonium chloride (GTAC).

11. A process as claimed in claim 6, wherein the alkylating agent used is at a concentration of at least 50 wt %.

12. An anion exchanger obtained by a process as claimed in claim 6.

13. A process as claimed in claim 7, wherein the alkylating agent is (3-chloro-2-hydroxypropyl)trimethylammonium chloride (CHPTAC).

14. A process as claimed in claim 8, wherein the alkylating agent is (3-chloro-2-hydroxypropyl)trimethylammonium chloride (CHPTAC).

15. A process as claimed in claim 7, wherein the alkylating agent is glycidyltrimethylammonium chloride (GTAC).

16. A process as claimed in claim 8, wherein the alkylating agent is glycidyltrimethylammonium chloride (GTAC).

17. A process as claimed in claim 7, wherein the alkylating agent used is at a concentration of at least 50 wt %.

18. A process as claimed in claim 8, wherein the alkylating agent used is at a concentration of at least 50 wt %.

19. A process as claimed in claim 9, wherein the alkylating agent used is at a concentration of at least 50 wt %.

20. A process as claimed in claim 10, wherein the alkylating agent used is at a concentration of at least 50 wt %.

21. A process as claimed in claim 13, wherein the alkylating agent used is at a concentration of at least 50 wt %.

22. A process as claimed in claim 14, wherein the alkylating agent used is at a concentration of at least 50 wt %.

23. A process as claimed in claim 15, wherein the alkylating agent used is at a concentration of at least 50 wt %.

24. A process as claimed in claim 16, wherein the alkylating agent used is at a concentration of at least 50 wt %.

\* \* \* \* \*

UNITED STATES PATENT AND TRADEMARK OFFICE
CERTIFICATE OF CORRECTION

PATENT NO. : 6,911,483 B2
DATED : June 28, 2005
INVENTOR(S) : Ayers et al.

It is certified that error appears in the above-identified patent and that said Letters Patent is hereby corrected as shown below:

Column 11,
Line 49, delete "($C_2$-$C_4$" and insert -- ($C_2$-$C_4$) --.

Column 12,
Line 4, delete "($C_2$-$C_4$" and insert -- ($C_2$-$C_4$) --.

Signed and Sealed this

Eighteenth Day of April, 2006

JON W. DUDAS
*Director of the United States Patent and Trademark Office*